(12) United States Patent
Fischer et al.

(10) Patent No.: US 11,612,265 B2
(45) Date of Patent: Mar. 28, 2023

(54) DEVICE AND METHOD FOR PREPARING FOODS HELD IN A VESSEL

(71) Applicant: Carogusto AG, Amriswil (CH)

(72) Inventors: Daniel Fischer, Romanshorn (CH); Philipp Schenk, Schönenberg (CH)

(73) Assignee: Carogusto AG, Amriswil (CH)

(*) Notice: Subject to any disclaimer, the term of this patent is extended or adjusted under 35 U.S.C. 154(b) by 0 days.

(21) Appl. No.: 16/960,954

(22) PCT Filed: Jul. 15, 2019

(86) PCT No.: PCT/EP2019/068985
§ 371 (c)(1),
(2) Date: Jul. 9, 2020

(87) PCT Pub. No.: WO2020/016170
PCT Pub. Date: Jan. 23, 2020

(65) Prior Publication Data
US 2021/0127886 A1    May 6, 2021

(30) Foreign Application Priority Data
Jul. 17, 2018  (EP) ..................................... 18184030

(51) Int. Cl.
*A47J 27/04*    (2006.01)
*A23L 5/10*    (2016.01)
*B08B 9/093*    (2006.01)

(52) U.S. Cl.
CPC ............. *A47J 27/04* (2013.01); *A23L 5/13* (2016.08); *B08B 9/093* (2013.01); *A23V 2002/00* (2013.01); *A47J 2027/043* (2013.01)

(58) Field of Classification Search
CPC ....... A47J 27/04; A47J 2027/043; A23L 5/13; B08B 9/093–0936
(Continued)

(56) References Cited

U.S. PATENT DOCUMENTS

| 1,666,015 A | * | 4/1928 | Land ....................... B08B 9/093 |
| | | | 134/102.1 |
| 3,672,908 A | | 6/1972 | Hice, Sr. |

(Continued)

FOREIGN PATENT DOCUMENTS

| CN | 202286150 U | 7/2012 |
| CN | 203000596 U | 6/2013 |

(Continued)

OTHER PUBLICATIONS

International search report for patent application No. PCT/EP2019/068985 dated Oct. 9, 2019.

*Primary Examiner* — Drew E Becker
*Assistant Examiner* — Austin Parker Taylor
(74) *Attorney, Agent, or Firm* — Bachman & LaPointe, P.C.

(57) ABSTRACT

A device (2) for preparing foods held in a vessel includes a preparation chamber (4) for holding the vessel, a steam-generating assembly (10), including at least one first steam-conducting path (18) and at least one cold-fluid-conducting path (54), a steam supply unit (62) having at least one steam dispensing opening into the preparation chamber (4), which steam supply unit is connected to the at least one steam-conducting path (18) for steam conduction, and a condensate supply unit (60) having at least one condensate dispensing opening into the preparation chamber (4), which condensate supply unit is connected to the steam-conducting path (18) and to the cold-fluid-conducting path (54). The device (2) can carry out preparation in which food held in the vessel can be prepared by the steam supply unit (62), and to carry out a rinsing operation, in which the preparation chamber (4) can be cleaned by the condensate supply unit (60).

6 Claims, 1 Drawing Sheet

(58) Field of Classification Search
USPC .......................................................... 426/416
See application file for complete search history.

(56) References Cited

U.S. PATENT DOCUMENTS

| | | | |
|---|---|---|---|
| 4,480,993 A | 11/1984 | Guiriec | |
| 5,442,997 A * | 8/1995 | Branz | A47J 27/16 366/101 |
| 6,772,751 B2 * | 8/2004 | Deuringer | F24C 14/005 126/20 |
| 2005/0051036 A1 * | 3/2005 | Erdmann | A21B 3/04 99/415 |
| 2006/0260476 A1 * | 11/2006 | Helm | F24C 14/005 99/476 |
| 2007/0110861 A1 * | 5/2007 | Hoffjann | H01M 8/00 426/412 |
| 2008/0053313 A1 * | 3/2008 | Goltenboth | A47J 31/60 99/290 |
| 2008/0223357 A1 * | 9/2008 | Bartelick | B08B 9/00 126/21 A |
| 2010/0086287 A1 * | 4/2010 | Rosenzweig | F22B 1/285 392/394 |
| 2011/0256287 A1 | 10/2011 | Sus et al. | |
| 2013/0019856 A1 * | 1/2013 | Buehler | A47J 39/006 126/369 |
| 2014/0251161 A1 * | 9/2014 | Matsushima | A47J 37/1214 99/348 |
| 2016/0341431 A1 * | 11/2016 | Topfer | B08B 9/0936 |

FOREIGN PATENT DOCUMENTS

| | | |
|---|---|---|
| CN | 203597816 U | 5/2014 |
| DE | 102012202318 A1 | 8/2013 |
| DE | 102012202318 B4 | 5/2015 |
| DE | 102015221005 A1 | 4/2017 |
| EP | 1717518 A1 | 11/2006 |
| JP | 2017042347 A | 3/2017 |
| SU | 1556649 A1 | 4/1990 |
| WO | 2011/129845 A1 | 10/2011 |

* cited by examiner

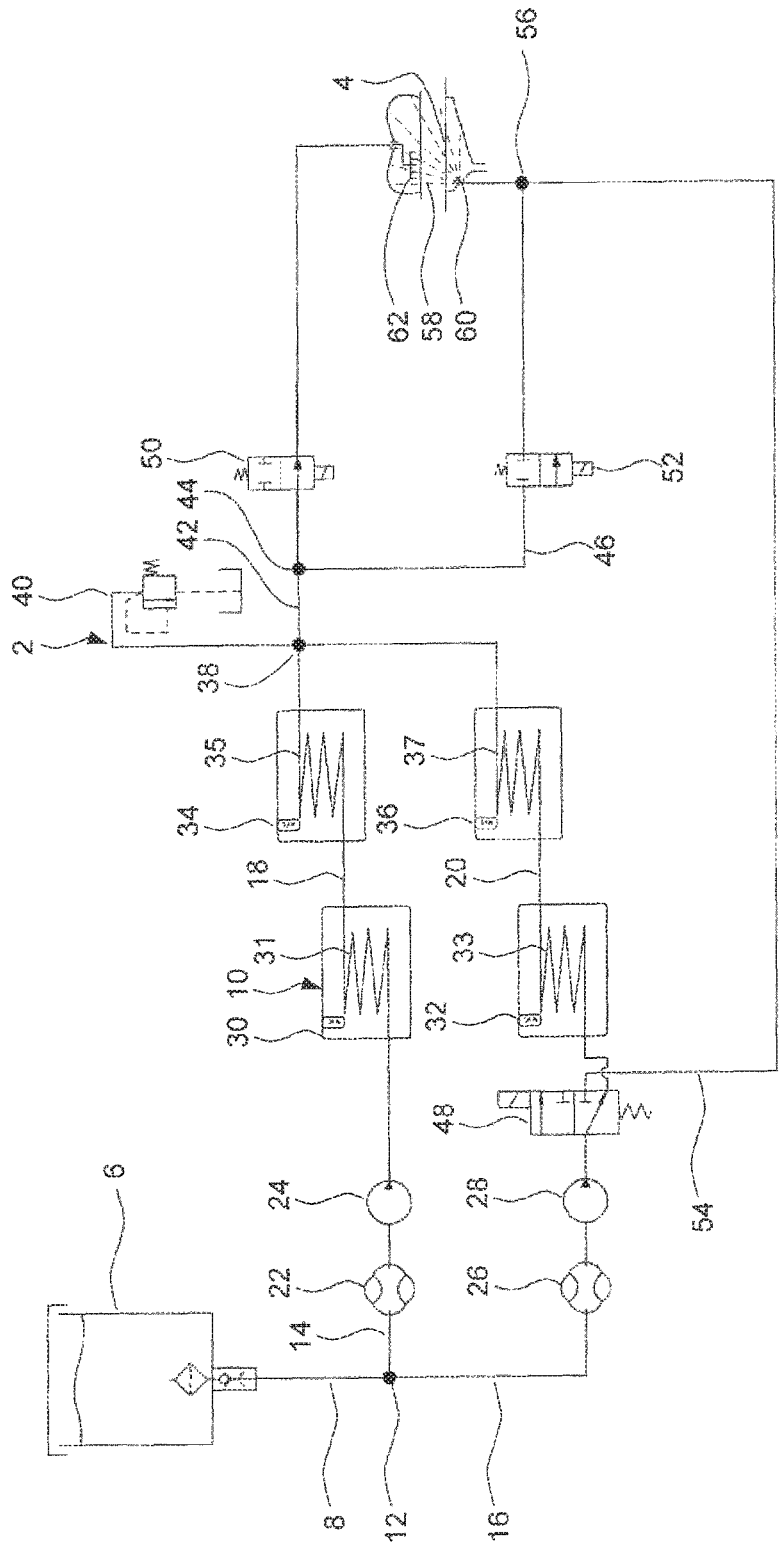

DEVICE AND METHOD FOR PREPARING FOODS HELD IN A VESSEL

BACKGROUND OF THE INVENTION

The invention relates to a device and a method for preparing foods received in a vessel, in particular ready meals.

U.S. Pat. No. 5,442,997 A discloses an automated cooking apparatus.

From DE 10 2015 221 005 A1, a system for providing steam is known which discloses a steam generator unit for generating steam and a steam overheating unit connected to the steam generator unit for overheating the steam which is generated in the steam generator unit. The system is used for preparing foods which are disposed in a corresponding vessel.

US 2011/256287 A1 discloses an apparatus and a method for heating food contained in the interior of a container. The apparatus comprises a steam generator for generating steam and a steam exit port in fluid communication with the steam generator. The steam is injected into the container through said exit port. The apparatus has a surface that permits the container interior to be put into an at least substantially sealed condition in a substantially closed environment, the exit port being in fluid communication with the interior of the container.

DE 10 2012 202 318 A1 discloses a device and a method for preparing prepared foods. To this end, the device comprises a heating nozzle in a bell-like cover. The cover covers a vessel which contains the food. Additionally, a cleaning nozzle is disclosed which is realized for cleaning, in particular, the cover of the vessel by means of a rinsing medium, such as steam and/or hot water. The steam which is used for this purpose and/or the hot water which is used for this purpose are provided specifically for the rinsing cycle. Therefore, an energy-intensive heating of the rinsing medium has to take place.

SUMMARY OF THE INVENTION

Therefore, the object of the present invention is to realize a device and a method for preparing foods received in a vessel which allows a rinsing medium to be provided in a simple and resource-efficient manner.

This object is attained by a device having the features disclosed herein and also by a method having the features disclosed herein.

The invention is based on the idea that the energy which is invested in the heating of the meal or of the food can be at least partially used for a cleaning process. Furthermore, it was established that a resource-efficient and improved cleaning effect can be obtained by cleaning not only by means of hot water or hot steam but, in particular, by means of a condensate. For this purpose, a cold fluid, such as water, can be injected into a steam, for example, which leads to a condensation reaction or to an at least partial transition of the steam from the gaseous state into the liquid state. It was established that such a condensate has a considerably improved cleaning effect.

A particular advantage accompanied by the improved cleaning effect is that a condensation reaction can already take place before the injection into the preparation chamber, i.e., before the actual cleaning.

According to the invention, a device for preparing foods received in a vessel, in particular ready meals, is proposed, the device comprising a preparation chamber for receiving the vessel, a steam generator assembly for generating steam, comprising at least one first steam-conducting path for conducting steam and at least one cold-fluid-conducting path for conducting fluid which is colder than the steam, a steam delivery unit having at least one steam discharge opening into the preparation chamber, said steam delivery unit being connected to the at least one steam-conducting path of the steam generator assembly in a steam-conducting manner, a condensate delivery unit having at least one condensate discharge opening into the preparation chamber, said condensate delivery unit being connected to the steam-conducting path of the steam generator assembly and to the cold-fluid-conducting path, the device being designed to perform a preparation operation in which the food received in the vessel can be prepared by means of the steam delivery unit so as to be ready to eat, and to perform a rinsing operation in which the preparation chamber can be cleaned by means of the condensate delivery unit.

By means of the device according to the invention, it is possible to generate steam in a preparation operation using the energy required for this purpose, and to supply said steam to the preparation chamber by means of the steam-conducting path. After preparing and, if applicable, after removing the vessel or the ready-to-eat food, the steam-generating element, which comprises a heating means, for example, can be partially or completely deactivated. This is because residual heat of such an element can be used to continue to generate steam at a lower temperature which is still sufficient for a rinsing operation. The residual steam can be mixed with a cold fluid before it enters the preparation chamber, said mixing leading to condensation. The resulting rinsing condensate leads to a considerably improved cleaning effect.

The designation "colder" of the fluid refers relatively to the temperature of the steam or of the residual steam and describes the fact that the fluid temperature is lower than the residual steam temperature.

According to a preferred embodiment of the device according to the invention, the steam delivery unit and the condensate delivery unit are realized either as separate units or as a single unit. A separate realization has the advantage that different discharge directions can be selected for the preparation steam in the preparation operation and the rinsing condensate in the rinsing operation. Said selection can take place without an adjustable construction. The embodiment as a single unit can reduce the required installation space and can be realized as a unit which can be manually or automatically adjusted.

According to an additional preferred embodiment of the device according to the invention, the steam generator assembly comprises at least one first steam generator unit which is connected to the first steam-conducting path in a steam-conducting manner and which is realized in such a manner that its first heating means is activated during the preparation operation and deactivated during the rinsing operation. In such an embodiment, the heating means does not require any supplied energy and can be de-energized, for example. Due to the residual heat which remains in the steam generator unit, it is still possible to generate steam which is processed by means of the cold fluid in order to obtain the rinsing condensate. Said embodiment significantly reduces the required use of energy.

According to an additional preferred embodiment, the device according to the invention comprises a second steam-conducting path, the steam generator assembly comprising a first steam generator unit which is connected to the first steam-conducting path in a steam-conducting manner and a second steam generator unit which is connected to the second steam-conducting path in a steam-conducting manner, preferably also a third steam generator unit which is connected to the first steam-conducting path in a steam-conducting manner and a fourth steam generator unit which is connected to the second steam-conducting path in a steam-conducting manner. In other words, two steam-conducting paths each having two steam generator units are provided. The steam generator units can be disposed in a serial manner along a steam-conducting path. It is conceivable that at least one, preferably all steam generator units are realized in such a manner that their heating means are activated during the preparation operation and deactivated during the rinsing operation. By means of such a device, a very short preparation time can be realized and a considerable amount of residual steam can be generated by several heating means which are still hot enough although they are deactivated. It is also conceivable that the steam generator unit disposed upstream of each steam-conducting path is realized for generating steam from water and that each steam generator unit disposed downstream can overheat the generated steam, for example to 180° C. The steam can be heated to a temperature of at least 150° C., in particular at least 170° C., in particular at least 190° C. and in particular at least 200° C., in the steam generator units disposed upstream of each steam-conducting path. The overheated steam from the steam generator units disposed downstream can have a temperature between 200° C. and 300° C. Additionally, the overheated steam can have a water content between 10 g to 15 g in relation to 100 ml process water, in particular of 11 g to 14 g, in particular of 12 g and 13 g. The use of two steam generator units at two steam-conducting paths results in an advantageous heat transfer to the fluid and/or the steam. As a result, a food can be prepared so as to be ready to eat in approximately 30 seconds, for example. The quantity of fluid used for the preparation can be between 50 ml and 80 ml.

It is also conceivable that the two steam-conducting paths are realized as parallel paths and that a pump unit and/or a flow sensor unit is/are disposed at each steam-conducting path. Different flow quantities per conducting path can thus be realized and identified.

According to an additional preferred embodiment according to the invention, the device comprises a first valve unit for selectively releasing either the second steam-conducting path or the cold-fluid-conducting path, the first valve unit being disposed upstream of the steam generator assembly. The cold-fluid-conducting path is thus realized as a bypass to the second steam-conducting path. In such an embodiment, residual steam is conveyed along the first steam-conducting path while the second steam-conducting path is deactivated. The fluid which is conveyed to the second steam-conducting path in the preparation operation can be deflected in order to be conveyed along the cold-fluid-conducting path without corresponding heating. The residual steam and the cold fluid react and produce the rinsing condensate.

According to an additional preferred embodiment, the device according to the invention comprises a second valve unit for selectively releasing either a section of a common steam-conducting path which comprises the first and the second steam-conducting path and which leads to the steam delivery unit, or a residual steam path which leads from a section of the common steam-conducting path disposed upstream of the second valve unit to the condensate delivery unit, the second valve unit being disposed downstream at the steam generator assembly. By means of the second valve unit, the entire steam generated by the steam generator assembly can be conveyed to the preparation chamber via the common steam-conducting path in the preparation operation. The second valve unit switches for the rinsing operation and releases a residual steam path which conveys a residual steam.

As an alternative to the second valve unit, separate valve units can be provided for the common steam-conducting path and the residual steam path. For this reason, an additional preferred embodiment of the device according to the invention comprises a second valve unit and a third valve unit, the second valve unit being realized for selectively releasing or blocking a section of a common steam-conducting path which comprises the first and the second steam-conducting path and which leads to the steam delivery unit, and the third valve unit being realized for selectively releasing or blocking a residual steam path which leads from a section of the common steam-conducting path disposed upstream of the second valve unit to the condensate delivery unit, the second valve unit and the third valve unit being disposed downstream of the steam generator assembly. By using the second valve unit and the third valve unit, the steam delivery unit and the condensate delivery unit can be operated at the same time or in an at least partially overlapping manner.

Regardless of the specific embodiment, the valve units can be realized as solenoid valves, for example.

According to an additional preferred embodiment of the device according to the invention, said device comprises a condensation chamber into which the cold-fluid-conducting path and the residual steam path lead and which is connected to the condensate delivery unit in a conducting manner. In an advantageous manner, the condensate for the improved cleaning can be generated in said condensation chamber which is disposed upstream of the condensate delivery unit.

According to an additional preferred embodiment, at least one/preferably all steam generator units is/are realized as instantaneous water heaters. An instantaneous water heater has a preferably electric heating element and can realize a heating in a short time. Additionally, such an instantaneous water heater does not need a long time until it is operational and can be controlled in a simple and safe manner.

Furthermore, a method for operating a device for preparing foods received in a vessel is proposed in order to solve the abovementioned problems, the method comprising the following steps:
 performing a preparation of the food in a preparation operation, comprising:
 supplying steam into a preparation chamber via a first-steam conducting path and a steam delivery unit,
 performing a cleaning of the preparation chamber in a rinsing operation, comprising:
 supplying a residual steam via a first steam-conducting path and a cold fluid via a cold-fluid-conducting path to a condensate delivery unit in order to generate a rinsing condensate into the preparation chamber.

The method according to the invention essentially has the advantages of the device, to which reference is hereby made.

It is also conceivable that the supplying is realized at a pressure of 4 bar and/or in a quantity of 200 ml per rinse.

All combinations of at least two features disclosed in the description, the claims and/or the figures constitute part of the scope of the invention.

In order to avoid repetitions, disclosed features relating to the device are also seen as relating to the method and are thus also claimable therefor. In the same manner, disclosed features relating to the method are also seen as relating to the device and are thus also claimable therefor.

BRIEF DESCRIPTION OF THE DRAWINGS

Further advantages, features and details of the invention can be derived from the following description of a preferred embodiment and from the drawing. In the only FIGURE, a schematic block diagram of a device for preparing foods received in a vessel is shown.

DETAILED DESCRIPTION

Device 2 shown in the only FIGURE is used for preparing foods which are disposed in a vessel (not shown) provided for this purpose. Device 2 is shown in the preparation operation and comprises a preparation chamber 4 for receiving the vessel. A preparation steam for preparing the food and a rinsing condensate for the rinsing can be applied to preparation chamber 4. In this context, "chamber" is not limited to an enclosed chamber.

Furthermore, device 2 comprises a water tank 6 which receives three to four liters, for example, of the fluid, which is realized as water. Water tank 6 feeds a steam generator assembly 10 of device 2 via a first water feed line 8. At a junction 12, water feed line 8 is split into a water feed line 14 and a water feed line 16. In water feed lines 8, 14 and 16, a pressure of 12 bar may be available, for example. Water feed line 14 feeds a first steam-conducting path 18 and water feed line 16 feeds a second steam-conducting path 20. To this end, water feed line 14 flows through a flow sensor unit 22 and a pump unit 24. Water feed line 16 also flows through a flow sensor unit 26 and a pump unit 28 and, additionally, a first valve unit 48. Both pump units 24 and 28 are used for conveying water from water tank 6 towards the two steam-conducting paths 18 and 20.

Two steam generator units 30, 32, 34 and 36 are disposed in a serial manner along each steam-conducting path 18 and 20. First and second steam generator units 30, 32 define the end of respective water feed lines 14 and 16 and the beginning of respective steam-conducting paths 18 and 20. First steam generator unit 30 and third steam generator unit 34 are disposed along first steam-conducting path 18. Second steam generator unit 32 and fourth steam generator unit 36 are disposed along second steam-conducting path 20. Each steam generator unit 30, 32, 34 and 36 comprises a boiler tank which has at least one heating means 31, 33, 35 and 37 disposed on the inside for heating the water, for example to 200° C., and for generating (water) steam. The two parallel steam-conducting paths 18 and 20 are merged in a steam-conducting manner at a junction 38 downstream of steam generator assembly 10. A safety valve 40 (not described in detail) is located there as well and lets steam escape from corresponding steam generator unit 30, 32, 34 and 36 or from corresponding steam-conducting path 18 and 20 in a controlled manner in order to avoid overpressure, for example if a critical maximum pressure is reached.

Individual steam generator units 30, 32, 34 and 36 are connected to one another along their respective steam-conducting path 18, 20 in a steam-conducting manner.

Starting from junction 38, first steam-conducting path 18 and second steam-conducting path 20 define a common steam-conducting path 42. A residual steam path 46 departs from said common steam-conducting path 42 downstream of junction 38 at a junction 44. In the preparation operation, common steam-conducting path 42 can deliver the steam of both steam-conducting paths 18 and 20. In the rinsing operation, residual steam path 46 can deliver residual steam of at least one of the two steam-conducting paths 18 and 20, wherein said residual steam can have a pressure of 4 bar.

The flow through common steam-conducting path 42 and residual steam path 46 can be controlled by means of a second valve unit 50 and a third valve unit 52. Second valve unit 50, which is disposed downstream of junction 44, is used for selectively releasing or blocking common steam-conducting path 42, which leads to preparation chamber 4. Second valve unit 50 is shown in its release position and thus releases common steam-conducting path 42 in a steam-delivering manner. Third valve unit 52, which is disposed downstream of junction 44, is used for selectively releasing or blocking residual steam path 46, which leads from junction 44 of common steam-conducting path 42, which is disposed upstream of the second valve unit, to preparation chamber 4. Third valve unit 52 is shown in its blocking position and thus blocks residual steam path 46.

A cold-fluid-conducting path 54 branches off from water feed line 16, wherein the flow of water from water tank 6 through cold-fluid-conducting path 54 can be controlled by first valve unit 48. Cold-fluid-conducting path 54 is realized as a bypass to second steam-conducting path 20. First valve unit 48 is shown in the position which releases water feed line 16. Residual steam path 46 and cold-fluid-conducting path 54 meet in a condensation chamber 56. By mixing residual steam with cold fluid or water, a condensate is produced (hereinafter referred to as rinsing condensate 58). Condensation chamber 56 is connected to a condensate delivery unit 60 in a conducting manner. Condensate delivery unit 60 is disposed in preparation chamber 4 and comprises at least one condensate discharge opening. Condensate delivery unit 60 is used for delivering rinsing condensate 58 into preparation chamber 4.

A steam delivery unit 62 disposed in preparation chamber 4 is connected to common steam-conducting path 42 in a steam-conducting manner, said steam delivery unit 62 thus being connected to both steam-conducting paths 18 and 20. Steam delivery unit 62 is used for delivering steam into preparation chamber 4, preferably into the vessel, for preparing the food.

Steam delivery unit 62 and condensate delivery unit 60 are realized as separate units.

Device 2 has a central control unit (not shown in detail) by means of which different processes for handling device 2 can be controlled. The control unit can have an input/output unit in the form of a touch screen. The screen can be realized for displaying method parameters, such as temperature and/or pressure of the delivered steam. Control commands to input/output unit 18 can be input via the touch function of the touch screen. In particular, the central control unit is used for controlling and performing a preparation operation in which the food received in the vessel is prepared so as to be ready to eat by means of steam delivery unit 62, and for performing a rinsing operation in which preparation chamber 4 can be cleaned by means of condensate delivery unit 60.

The preparation operation is to be described below. A suitable quantity of water provided in water tank 6 is conveyed along water feed lines 8, 14 and 16 to steam generator assembly 10 by means of a cycle operation of pump units 24 and 28. For this purpose, first valve unit 48 is de-energized or set in such a manner for second steam-conducting path 20 that a flow of water to second steam generator unit 32 is enabled. Steam generator units 30, 32, 34, and 36 generate steam from the water along each steam-conducting path 18 and 20, the steam being merged in 38 and flowing through common steam-conducting path 42 towards preparation chamber 4. To this end, second valve unit 50 opens common steam-conducting path 42 and third valve unit 52 closes residual steam path 46. The steam which is conveyed to preparation chamber 4 enters preparation chamber 4 through steam delivery unit 62. The food received in a vessel which is disposed in said preparation chamber 4 is thus prepared so as to be ready to eat.

The rinsing operation is to be described below. A suitable quantity of the water provided in water tank 6 is conveyed along water feed lines 8, 14 and 16 by means of a cycle and preferably full-power operation of pump units 24 and 28. A high pressure can be created by the full-power operation, the high pressure resulting in a good cleaning effect.

Since the path of water feed line 14 to first steam generator unit 30 is free, water enters first steam generator unit 30 and therefore first steam-conducting path 18. In the shown example, heating means 31, 33, 35 and 37 of steam generator units 30, 32, 34 and 36 are deactivated in the rinsing operation. Due to the preceding preparation operation, said heating means 31, 33, 35 and 37 are still hot enough for generating residual steam. The water which flows from water feed line 8 into water feed line 14 to first steam generator unit 30 is thus heated along first steam-conducting path 18 in order to obtain residual steam. Starting from junction 38, the residual steam is conveyed in common steam-conducting path 42, second steam-conducting path 20 not providing any steam or residual steam (described below). In contrast to the preceding preparation operation, second valve unit 50 is displaced into its blocking position (not shown) and blocks a residual steam line to steam delivery unit 62. Third valve unit 52 is displaced into its release position (not shown) and releases a residual steam line along residual steam path 46 to condensate delivery unit 60.

The water flowing from water feed line 8 into water feed line 16 reaches first valve unit 48 which, in contrast to the preceding preparation operation, blocks water feed line 16 to second steam generator unit 32 (blocking position is not shown) and releases bypass-like cold-fluid-conducting path 54. The water which flows through water feed line 16 therefore flows around steam generator assembly 10 and is not heated. The still cold water is conveyed to condensation chamber 56 via cold-fluid-conducting path 54.

The cold water from cold-fluid-conducting path 54 and the residual steam from residual steam path 46 meet in condensation chamber 56. As a result of the potentially considerable temperature difference between the cold water and the residual steam, a rinsing condensate 58 is produced from a condensation reaction. Condensation chamber 56 is connected to condensate delivery unit 60 in a conducting manner and therefore conducts produced rinsing condensate 58 into condensate delivery unit 60, which, in turn, discharges it into preparation chamber 4 in order to clean said preparation chamber 4.

REFERENCE SIGNS 2 device
4 preparation chamber
6 water tank
8 water feed line
10 steam generator assembly
12 junction
14 water feed line
16 water feed line
18 first steam-conducting path
20 second steam-conducting path
22 flow sensor unit
24 pump unit
26 flow sensor unit
28 pump unit
30 first steam generator unit
31 first heating means
32 second steam generator unit
33 second heating means
34 third steam generator unit
35 third heating means
36 fourth steam generator unit
37 fourth heating means
38 junction
40 safety valve
42 common steam-conducting path
44 junction
46 residual steam path
48 first valve unit
50 second valve unit
52 third valve unit
54 cold-fluid-conducting path
56 condensation chamber
58 rinsing condensate
60 condensate delivery unit
62 steam delivery unit

The invention claimed is:

1. A method for operating a device (2) for preparing foods received in a vessel, the method comprising the following steps:
   performing a preparation of the food in a preparation operation, comprising:
   supplying water to a steam generator unit (30, 32, 34, 36) in an active mode to generate steam and flow the steam into a preparation chamber (4) via a first steam-conducting path (18) and a steam delivery unit (62) to heat the food,
   performing a cleaning of the preparation chamber (4) in a rinsing operation, comprising:
   supplying water to the steam generator unit (30, 32, 34, 36) in an inactivated mode whereby residual heat in the steam generator unit produces and supplies residual steam via the first steam-conducting path (18) to a condensation chamber (56);
   supplying a cold fluid via a cold-fluid-conducting path (54) to the condensation chamber to mix with the residual steam and form a rinsing condensate; and
   supplying the rinsing condensate to a condensate delivery unit (60) in order to flow the rinsing condensate into the preparation chamber (4).

2. The method according to claim 1, wherein the supplying residual steam is realized at a pressure of 4 bar and/or in a quantity of 200 ml per rinse.

3. The method according to claim 1, wherein foods prepared in the preparation operation are ready meals.

4. The method according to claim 1, further comprising a second steam-conducting path (20) having a parallel steam generator unit (32, 34), and wherein during food preparation, water is supplied along a parallel water feed line (16) to the second steam-conducting path to produce additional steam to the preparation chamber (4), and wherein during rinsing, water in parallel water feed line (16) bypasses the second steam-conducting path (20) and flows to the cold-fluid-conducting path (54) as the cold fluid.

5. The method according to claim 1, wherein the residual heat in the steam generation unit in the inactive mode is heat remaining from the step of supplying water to the steam generation unit in the active mode.

6. The method according to claim 1, further comprising, after the step of performing the preparation of the food, switching the steam generation unit to an inactive mode whereby the steam generation unit is inactive and contains the residual heat.

\* \* \* \* \*